United States Patent Office 3,830,761
Patented Aug. 20, 1974

3,830,761
VINYL CHLORIDE-ETHYLENE-VINYL ACETATE RESIN BINDERS
William Edward Lenney, Middlesex, N.J., assignor to Air Products and Chemicals, Inc., Allentown, Pa.
No Drawing. Filed Oct. 26, 1971, Ser. No. 192,297
Int. Cl. C08f 45/00; C09d 5/02
U.S. Cl. 260—8          10 Claims

ABSTRACT OF THE DISCLOSURE

Vinyl chloride-ethylene-vinyl acetate emulsion interpolymers are disclosed which provide synthetic polymer dispersions having utility as pigment binders in water based paints. The vinyl chloride-ethylene-vinyl acetate interpolymers have a glass transition temperature ($T_g$) of between about 20 degrees C. and about −10 degrees C. Substantially improved characteristics, including improved scrub resistance, are obtained when the interpolymers are substituted for conventional resinous binders in paint formulations.

FIELD OF THE INVENTION

The present invention is related to the preparation of vinyl chloride-ethylene-vinyl acetate interpolymers, and more particularly, to the synthesis of vinyl chloride-ethylene-vinyl acetate interpolymers which have utility as resin binders in water based paints of both interior and exterior types.

BACKGROUND OF THE INVENTION

It is well known that various polymeric materials can be incorporated into water based paints as suitable pigment binders. Styrene-butadiene copolymers, vinyl acetate-acrylic ester copolymers and vinyl acetate-maleic diester copolymers have been employed for this purpose. While some of these pigment binders provide good results, the paint industry has sought to find pigment binders which would provide at least equivalent results at a considerably lower cost.

In general, paints are tailor made for interior use or for exterior use. Exterior paints have a more rigorous set of requirements since they are normally exposed to much more severe conditions after they have been applied, particularly temperature conditions. For example, in many areas of the country where such paints are used, summer temperatures exceed 90 degrees F. while in the same areas winter temperatures frequently fall to 0 degrees F. or below. To be satisfactory, a paint must not soften so as to become tacky at the high temperatures experienced during the summer months and must not become brittle and crack at the low winter temperatures. If the paint softens during the summer, dirt and other foreign matter will adhere to it and cleaning the paint film becomes very difficult and, in most cases, impossible. The need to avoid cracking of paint film is obvious, since cracked film no longer provides continuous protection for the coated surface. In the past it has been difficult to meet this combination of requirements successfully with water based paints applied directly to raw wood surfaces, i.e., to surfaces of wood which have not been previously painted or otherwise treated. In order to meet the requirements for exterior paints, relatively expensive compositions have been produced. The compositions especially made for exterior usage normally can not compete commercially with the less expensive formulations sold for interior use.

There is accordingly an important need for water based paint which can be manufactured inexpensively and which is capable of meeting the different requirements of both interior and exterior paints.

SUMMARY OF THE INVENTION

An object of the present invention is to provide vinyl chloride-ethylene-vinyl acetate interpolymers which can be used as resin binders for water based paints.

Another object of the present invention is to provide resin binders for water based paints which will permit aqueous paint compositions to be made inexpensively for either interior or exterior use.

A further object of the present invention is to provide vinyl chloride-ethylene-vinyl acetate interpolymers which can be incorporated into paint compositions to obtain improved characteristics, including improved scrub resistance.

Still a further object of the present invention is to provide interpolymer emulsions based on vinyl chloride, ethylene and vinyl acetate which have a glass transition temperature ($T_g$) of between about 20 degrees C. and about −10 degrees C.

In accordance with the present invention, interpolymer emulsions based on vinyl chloride, ethylene and vinyl acetate, having a glass transition temperature ($T_g$) between about 20 degrees C. and about −10 degrees C., are prepared which can be used as resin binders for water based paints. Preferably the interpolymers are prepared by interpolymerizing vinyl chloride, ethylene and vinyl acetate monomers. Copolymers of vinyl chloride and ethylene which meet the required $T_g$ requirements can sometimes be prepared for the same applications, but without necessarily obtaining equivalent results as terpolymers of vinyl chloride, ethylene and vinyl acetate, e.g., with respect to water permeability characteristics.

The vinyl chloride-ethylene-vinyl acetate interpolymer emulsions can be compounded into various water based paint compositions with one or more conventional compounding ingredients, such as pigments, thickeners, solvents, dispersing agents, etc.

The resulting vinyl chloride-ethylene-vinyl acetate interpolymer emulsions provide improved water based paint formulations. In particular, scrub resistance and dirt pick up characteristics are improved in the formulations while the overall cost of the formulations is lowered. Moreover, the vinyl chloride-ethylene-vinyl acetate interpolymer emulsions of the present invention can be incorporated into water based paint formulations using conventional equipment.

DESCRIPTION OF THE PREFERRED EMBODIMENT

In accordance with the present invention, vinyl chloride-ethylene-vinyl acetate interpolymer emulsions are prepared. These interpolymer emulsions, which have a glass transition temperature ($T_g$) of between about 20 degrees C. and −10 degrees C., have utility as pigment binders for water based paints.

Any interpolymer of vinyl chloride, ethylene and vinyl acetate which results in the formulation of an interpolymer having a glass transition temperature ($T_g$) of between about 20 degrees C. and about −10 degrees C. can be employed. The glass transition temperature, referred to as the $T_g$, is the temperature above which a polymeric material exhibits rubbery characteristics. The weight percentage of vinyl chloride in the interpolymer can vary between about 90 and about 35 percent by weight. The weight percentage of ethylene in the interpolymer is normally between about 5 and about 30 weight percent. Finally, the amount of vinyl acetate in the interpolymer can vary between 0 and about 40 percent by weight.

Conventional emulsion polymerization techniques are employed to prepare the vinyl chloride-ethylene-vinyl acetate interpolymers of this invention.

Various free radical forming catalysts can be used for carrying out the polymerization of the monomeric materials. These catalysts include peroxide compounds. Also suitable are combination type catalysts employing both reducing agents and oxidizing agents. In the use of this type of combined catalyst the reducing agent is generally referred to as the activator and the oxidizing agent as an initiator. Suitable reducing agents or activators include bisulfites, sulfoxylates, or other compounds having reducing properties such as ferrous salts, and tertiary aromatic amines, e.g., N,N-dimethyl anilines. The oxidizing agents or initiators include hydrogen peroxide, persulfates, such as ammonium or potassium persulfate, perborates, and the like. Specific combination type catalysts or redox systems which can be used include hydrogen peroxide and zinc formaldehyde sulfoxylate; hydrogen peroxide, ammonium persulfate or potassium persulfate, with sodium metabisulfite, sodium bisulfite, ferrous sulfate, dimethylaniline, zinc formaldehyde sulfoxylate or sodium formaldehyde sulfoxylate. It is advantageous to utilize the more water-soluble peroxides, such as hydrogen peroxide, rather than the more oil-soluble peroxides, such as t-butyl hydroperoxide in the redox system, to catalyze the monomer polymerization of this invention. Redox catalyst systems are described for example, in "Fundamental Principles of Polymerization" by G. F. D'Alelio, published by John Wiley & Sons, Inc., New York (1952) at page 333 et seq. Other types of catalysts that are well known in the art can also be used to polymerize the monomers with or without the addition of reducing agents or other activating materials.

Typically, the catalyst is employed in an amount between about 0.1 and about 2%, preferably between about 0.25 and about 0.75%, based on the weight of the monomeric materials introduced into the system. The activator is ordinarily added in aqueous solution and the amount of activator is generally 0.25 to 1 times the amount of catalyst.

The emulsifying agents which can be used are non-ionic, anionic or a combination of both non-ionic and anionic emulsifying agents. Suitable non-ionic emulsifying agents include polyoxyethylene condensates. Some specific examples of polyoxyethylene condensates which can be used include polyoxyethylene aliphatic ethers such as polyoxyethylene lauryl ether, polyoxyethylene oleyl ether, polyoxyethylene hydroabietyl ether and the like; polyoxyethylene alkaryl ethers such as polyoxyethylene nonylphenyl ether, polyoxyethylene octylphenyl ether and the like; polyoxyethylene esters of higher fatty acids such as polyoxyethylene laurate, polyoxyethylene oleate and the like as well as condensates of ethylene oxide with resin acids and the tall oil acids; polyoxyethylene amide and amine condensates such as N-polyoxyethylene lauramide, and N-lauryl-N-polyoxyethylene amine and the like; and polyoxyethylene thioethers such as polyoxyethylene N-dodecyl thioether.

The non-ionic emulsifying agents which can be used according to this invention also include a series of surface active agents known as the "Pluronics" which have the general formula:

$$HO(C_2H_4O)_a(C_3H_6O)_b(C_2H_4O)_cH$$

where a, b and c are integers of 1 or above. As b increases, and a and c remain substantially constant, the compounds become less water soluble or more oil soluble and thus more hydrophobic.

Some specific examples of non-ionic emulsifying agents include a polyoxyethylene nonylphenyl ether having a cloud point of between 126 and 133 degrees F., a polyoxyethylene nonylphenyl ether having a cloud point of about 212 degrees F., a polyoxyethylene nonylphenyl ether having a cloud point of 86 degrees F., and a polyoxyethylene octyl phenyl ether having a cloud point of between 80 degrees F. and 160 degrees F. Cloud points recited are based on 1% aqueous solutions.

A single emulsifying agent can be employed or emulsifying agents can be used in combination. When combination of emulsifying agents are used, it is advantageous to use a relatively hydrophobic emulsifying agent in combination with a relatively hydrophilic agent. A relatively hydrophobic agent is one having a cloud point in 1% aqueous solution below 190 degrees F., and a relatively hydrophilic agent is one having a cloud point in 1% aqueous solution of 190 degrees F. or above.

Examples of suitable anionic emulsifying agents include alkali lauryl sulfate, alkyl aryl sulfate and alkyl aryl sulfonate.

Typically, the concentration range of the total amount of emulsifying agents useful is from about 0.5 to about 5% based on aqueous phase of the latex, regardless of the solids content.

Latex stabilizers are also advantageously used. The stabilizers employed are, in part, governed by the intended particle size of the interpolymer. When the latices are to have a very small particle size, e.g., below 0.25 microns, an ethylenically unsaturated acid having up to 6 carbon atoms is advantageously used as the stabilizer. Typical acids of this character are acrylic acid, methacrylic acid, itaconic acid, maleic acid, vinyl sulfonic acid and the like. These unsaturated acids impart increased stability to the latices. Furthermore, they tend to copolymerize with the monomers in the system. The amount of unsaturated acid used is suitably 0.1 to 3%, preferably 0.2 to 1%, based on weight of total monomers.

A protective colloid is preferably used in the polymerization mixture. While various amounts of colloids can be incorporated into the latices as desired, it is preferred to maintain the colloid concentration at the lowest level possible to insure a coating with good water and scrub resistance and yet obtain the desired viscosity. The amount of colloid used will also depend upon the particular colloid employed. Colloids of higher molecular weight tend to produce a latex of a higher viscosity than like amounts of a lower molecular weight colloid. Other properties of the colloids, aside from their molecular weight, also affect the viscosity of the latices and the properties of the film formed therefrom. It is advantageous to maintain the colloid content of the latices between about 0.05% and about 2% by weight and preferably between about 0.15% and about 0.9% by weight, based on the total latex. Hydroxyethyl cellulose is a particularly advantageous colloid, imparting unusually good properties to the polymer latices and to the coatings formed therefrom.

Various other colloids can also be used with the latices of the invention including polyvinyl alcohol, partially acetylated polyvinyl alcohol, e.g., up to 50% acetylated, casein, hydroxyethyl starch, carboxymethyl cellulose, gum arabic, and the like, as known in the art of synthetic polymer latex technology.

In order to maintain the pH of the system at the desired value, there is suitably added an alkaline buffering agent of any convenient type. Any alkaline material which is compatible with the stabilizing agent can be used as the buffer. The amount of buffer is that sufficient to adjust the pH of the system within the desired range. Ammonium and sodium bicarbonate are preferred buffers because of their compatibility with the system and their low cost. Other buffers, such as disodium phosphate, sodium acetate, and the like, can, however, also be used. The amount of buffer is generally between about 0.1 and about 0.5% by weight, based on the monomers.

Latices of relatively high solids content can be directly produced by the described process. Lower reaction temperatures for polymerizing vinyl acetate than have heretofore been feasible economically can be used in the process. The use of lower reaction temperatures has been found to result in higher molecular weight for the vinyl chloride-ethylene-vinyl acetate interpolymer. The reaction temperature can also be controlled by rate of catalyst addition and by rate of heat dissipation therefrom. Generally, it is advantageous to maintain a mean temperature of about 50 degrees C. during the polymerization of the monomers and to avoid temperatures much in excess of 80 degrees C.

While temperatures as low as about 30 degrees C. can be used, economically, the lower temperature limit is about 35 to 40 degrees C.

The reaction time will also vary depending upon other variables such as temperature, catalyst and the desired extent of polymerization. It is generally desirable to continue the reaction until there is no visual exotherm or until less than 0.5% of the vinyl acetate remains unreacted. In general, a reaction time of about 6 hours has been found to be sufficient for complete polymerization, but reaction times ranging from 3 to 10 hours have been used, and other reaction times can be employed if desired.

In carrying out the polymerization, a substantial amount of the vinyl chloride is initially charged to the polymerization vessel and saturated with ethylene. Vinyl acetate is incrementally added during the course of the polymerization. If desired, all of the vinyl chloride can be charged initially with no additional incremental supply.

The quantity of ethylene entering into the interpolymer is influenced by concentration and type of surfactant and by pressure, agitation and viscosity of the polymerization medium. Thus, to increase ethylene content of the interpolymer, higher pressures are employed. Pressures in excess of 120 atmospheres are not required even to introduce 30% by weight of ethylene into the interpolymer. Preferably a pressure of at least about 25 atmospheres is employed. When high ethylene contents are desired, a high degree of agitation should be employed and high viscosities should be avoided. When referring to viscosities, a viscosity of 30 to 150 centipoises is considered a low viscosity, a viscosity of 151 to 800 centipoises is considered a medium viscosity, and a viscosity of 801 to 3000 centipoises considered a high viscosity.

The process of forming the interpolymer latices generally comprises the preparation of an aqueous solution containing at least some of the emulsifying agent and stabilizer and the pH buffering system. This aqueous solution and the initial charge of vinyl chloride are added to the polymerization vessel and ethylene pressure is applied to the desired value. The mixture is thoroughly agitated with the agitation being continued until substantial equilibrium is achieved. This generally requires about 15 minutes although less time can be required depending upon the vessel, the efficiency of agitation, the specific system, and the like. In any case, by measuring the pressure drop of the ethylene in a conventional manner, the realization of substantial equilibrium can be easily determined. Conveniently, the charge is brought to polymerization temperature during this agitation period. Agitation can be affected by shaking, by means of an agitator, or any other well known mechanism. The polymerization is then initiated by introducing initial amounts of catalyst and of activator, when used. After polymerization is started, the catalyst and the activator are incrementally added as required to continue polymerization and the vinyl acetate and the remaining vinyl chloride, if any, are added.

The reaction continues until the residual vinyl acetate content is below 0.5%. The completed reaction product is allowed to cool to room temperature, while sealed from the atmosphere. The pH is then suitably adjusted to a value in the range of 4.5 to 7 and preferably in the range of 6 to 6.5 to insure maximum stability.

The particle size of the latex can be regulated by the quantity of the emulsifying agent or agents employed and by the use of a colloidal stabilizing agent. Thus, to obtain smaller particles sizes, greater amounts of emulsifying agents are used. For example, to provide average particle sizes below about 0.25 microns, only a very small amount of a colloidal stabilizing agent should be employed. As a general rule, the smaller the amount of emulsifying agent employed and the greater the amount of the colloidal stabilizing agent included in the latex system, the greater the average particle size. Conversely, the greater the amount of emulsifying agent employed and the smaller the amount of the colloidal stabilizing agent used, the smaller the average particle size.

Aqueous paint compositions based on the vinyl chloride-ethylene-vinyl acetate interpolymers of the present invention can also contain appropriate quantities of stabilizers, suspending agents and the like. These additional components of water based paints are well known materials and their use in water based paints is fully described by the prior art.

The paint which is prepared from the interpolymer latex can be prepared by conventional techniques used in the preparation of paints from synthetic polymer latices. However, there is a preferred method which has been found to give the desired paint with ease and with a minimum of time. In the preferred method of preparation, the pigment is blended in a mixer with dispersing agents which can comprise a water soluble, non-ionic surface active agent, a water soluble anionic pigment dispersant or surface active agent, and water soluble thickeners. If desired, the thickener can be omitted from the paste and added during a later period.

The above mentioned ingredients are generally mixed to form a heavy paste for a minimum time of 20 minutes. At this point an anti-foam agent, such as tributylphosphate, can be added if desired. The paste is then reduced or let down with a latex. Ordinarily, a coalescing solvent is added at this point during the let down in the making of conventional water base latex paints to improve fusion of the particles into a continuous film. For example, diethylene glycol monoethyl ether acetate or the like is suitable as a coalescing solvent.

In general, it is desirable that the pH of the completed latex paint be between about 7 and about 10 and preferably between about 7.5 and about 9.

The reduction or let-down mixture can also contain other ingredients such as thickeners, fungicides, etc. Phenylmercuric acetate is an example of a suitable fungicide.

Among suitable pigments which can be used in accordance with this invention are finely divided rutile titanium dioxides and the like. Other examples of pigments include lithopone, antimony oxide, barytes, diatomaceous silica, clay, mica, iron oxides, cadmium red, chromium oxide clay, mica, iron oxides, cadmium red, chromium oxide, green, lampblack, carbon black, mineral black and luminescent pigments.

The pigments can be used even when the pigment sizes are as small as 0.1 micron. The amount of pigment used can vary, but generally 6 pounds per gallon of finished paint is a practical maximum.

Among the preferred water soluble non-ionic surface agents used in the preparation of latex paint are those described above in connection with the preparation of the resin latex. The water soluble non-ionic surface active agent, when used, is included in amounts between 0.01 and about 1.5 weight percent, based on the total weight of the latex paint.

Thickeners which can be used include cellulosic materials such as methyl cellulose, hydroxyethyl cellulose and carboxy methyl cellulose. Such thickeners are generally included in amounts between about 0.1 and about 0.5 weight percent, based on the total weight of the latex paint.

The preferred anionic pigment dispersants are those composed of polymerized sodium salts of alkyl naphthalene sulfonic acid. Other anionic dispersants which can be used are the sodium salt of polymerized alkyl aryl sulfonic acid, and the sodium salt of condensed sulfonic acid. Typical anionic surfactants are disclosed, for example, in Chapter 2 of "Surface Active Agents and Detergents" by A. M. Schwartz et al., published by Interscience Publishers of New York (Vol. 2, 1958). When used, the anionic dispersant is included in an amount between about 0.01 and about 1.5 weight percent, based on the total weight of the latex paint.

Thus, the relative proportions of the several components of a paint composition can vary to suit individual requirements. But in general, the composition has the following relative relationships, per hundred parts of the interpolymer, all parts being by weight:

| | |
|---|---|
| Vinyl chloride-vinyl acetate-ethylene interpolymer (solids basis) | 100 |
| Pigment | 10–1000 |
| Dispersing agent(s) | 0.5–10 |
| Coalescing solvent | 0–10 |
| Water—sufficient to provide solids content of 40 to 60 percent. | |

It will, of course, be understood that other conventional additives customary in the compounding of water based latex paints can be included in the paint formulations.

Some of the important paint properties are enamel holdout, Gardener scrub resistance, washability or stain removal and freeze-thaw stability.

For determining enamel holdout, drawdowns of test paints are made on all white MOREST charts, form HC, using a 6 inch wide Bird applicator with a 0.003 inch clearance. After drying overnight at 73 degrees F., ±2 Fahrenheit degrees, a semi-gloss conforming to Federal Specification TT-P-508 is drawn across the test paints, and when dry, the sixty degree gloss is checked both over the sealed and unsealed portions of the chart.

Scrub resistance (wet abrasion) is conducted in accordance with Federal Test Method Standard No. 141a, Method 6142, except that a 50% slurry of "Ajax" cleanser is substituted for the Ivory solution.

Freeze-thaw stability is checked in accordance with Federal Test Method Standard No. 141a, Method 4144.

Washability or stain removal is determined by applying stains such as pencil, lipstick, and Crayola stains to painted surface. The ease of removal is then checked by scrubbing with a hand held towel wet with a 5% "Mr. Clean" solution.

In connection with the enamel holdout property, scrub resistance property and stain removal properties, the ratings applied vary from 4 (excellent) to 1 (poor).

The invention will now be more specifically illustrated by reference to the following examples, it being understood that these examples are given for illustrative purposes only and are not limitative of the invention.

Example I

The equipment utilized for polymerization in accordance with this example included a 15 gallon, 316 stainless steel jacketed vessel having a maximum working pressure rating of 1000 p.s.i. at 400 degrees F. and a 15 gallon, packed stirring autoclave having a maximum working pressure of 2000 p.s.i. at 200 degrees F. which was equipped with a variable speed motor of stainless steel construction.

Pre-polymerization was accomplished by dispersing hydroxyethyl cellulose in cold water at a 3% level, followed by heating the water to 65 to 75 degrees C. and holding the temperature for approximately 1 hour. 242 grams of alkali lauryl sulfate, 760 grams of ethoxylated nonylphenol, 58.5 grams of hydroxyethyl cellulose, 10 grams of citric acid and 27 pounds of deionized water were premixed using mild agitation to prevent foam generation and the pH was then adjusted to 3.2 with disodium phosphate. The resulting homogeneous solution was transferred to the 15 gallon reactor after the reaction vessel had been purged with nitrogen gas. Subsequent to the transfer, agitation was initiated and adjusted to 200 revolutions per minute. 275 grams of $(NH_4)_2S_2O_8$ and 0.5 grams of ferric persulfate were dissolved in deionized water and added to the vessel. The vessel was then sealed and purged twice with nitrogen gas and once with ethylene. Six pounds of vinyl chloride were pumped into the reactor. Heat was applied to the vessel to raise the temperature of the total initial charge to 41 degrees C. During the heating, ethylene gas was introduced by a subsurface feed to yield a total pressure of 800 pounds per square inch. After equilibrium conditions were reached, approximately 15 to 20 minutes later, a 2% sodium sulfoxylate formaldehyde solution was initiated at the rate of 2.4 liters per hour. Initiation of polymerization was observed after 15 minutes by an increase in both the reaction temperature and total pressure. The reactor temperature controller was adjusted to maintain the process temperature at 45 degrees C. The sodium sulfoxylate formaldehyde feed rate was immediately reduced to 0.5 liters per hour and two delayed feeds were started simultaneously. The first delay feed consisted of 30 pounds of vinyl chloride and 9 pounds of vinyl acetate. The second delayed feed consisted of an aqueous acid salt comprising 310 grams of acrylic acid, 63.4 grams of potassium hydroxide and 4580 grams of deionized water. When the heat of polymerization was sufficient to lower the cooling jacket temperature to 15 degrees C., the sodium sulfoxylate formaldehyde was switched to automatic control. Fifteen minutes after initiation the total pressure was increased to 900 pounds per square inch. No other ethylene gas additions were made after topping off at 900 pounds per square inch. The polymerization proceeded at a relatively constant reactor rate of 0.47 liters per hour for a period of four hours. At this point the monomer feeds were terminated and the aqueous acid salt allowed to continue for an additional one hour period. With the termination of both final feeds, a gradual pressure increase from 940 to 1025 pounds per square inch was noted. After five hours, the acid salt feed was completed and the total pressure had begun to decay to 1000 pounds per square inch. Five and one-half hours after initiation, the residual monomer was reduced to 0.75% and pressure had further decayed to 905 pounds per square inch. The activator feed which was still on automatic control and pumping at full stroke (2.4 liters per hour) was terminated. Cooling was then applied to the jacket and when the batch temperature was lowered to 30 degrees C. a dilute solution of ammonium hydroxide was pumped into the reactor to adjust the final pH to 8.2. The batch was transferred to a degasser at 770 pounds per square inch at 25 degrees C. The emulsion was allowed to remain in the degasser overnight to defoam.

Based on total solids, the interpolymer contained 61.6 weight percent of vinyl chloride, 15.4 weight percent of vinyl acetate and 17.1 weight percent of ethylene, the latter being calculated from material balance.

Example II

A test paint formulation was preparted in accordance with the following formulation.

| Ingredient: | Parts by weight |
|---|---|
| Hydroxyethyl cellulose, 2% solution | 220 |
| Anionic dispersant (including potassium tripolyphosphate) | 7.5 |
| Nonionic surfactant (ethoxylated nonyl phenol) | 3 |
| Ethylene glycol | 25 |
| Defoamer | 3 |
| Preservative | 0.3 |
| Titanium dioxide | 250 |
| Calcined clay | 75 |
| Calcium carbonate | 75 |
| Silica-alumina | 50 |
| Water | 190 |
| Coalescing solvent | 8 |
| Emulsion interpolymer (55% solids) | 265 |

When a vinyl chloride-ethylene-vinyl acetate interpolymer having a $T_g$ of 3.5 degrees C. was prepared in accordance with Example I and employed as the emulsion interpolymer in the above test paint formulation, several advantages were observed over a similar paint formulation which employed vinyl acetate-dioctyl maleate as the emulsion interpolymer. These advantages included excellent alkali resistance, improved mildew resistance, less dirt pickup and improved efflorescence resistance.

Example III

Employing the test paint formulation set forth in Example II, three paint formulations were similarly prepared. In each of the formulations, carbitol acetate was employed as the coalescent solvent. Formulation A employed vinyl acetate-dioctyl maleate as the emulsion interpolymer; Formulation B was a vinyl chloride-ethylene interpolymer having a $T_g$ of 1.5; and Formulation C was a vinyl chloride-ethylene-vinyl acetate interpolymer having a $T_g$ of 8.5. A comparison of the resulting paint properties is shown below.

| Paint properties | Formulations | | |
|---|---|---|---|
| | A | B | C |
| Enamel holdout | 4 | 4 | 4 |
| Gardener scrub, 48-hour (dry) | 2 | 3– | 4 |
| Finger scrub | 3 | 3 | 4 |
| Reflectance | 91.3 | 91.3 | 91.0 |
| Leveling | 3 | 3 | 3 |
| Viscosity, 0 hours (KU) | 82 | 85 | 80 |
| Viscosity, 24 hours (KU) | 82 | 88 | 82 |
| pH, 24 hours (room temperature) | 7.7 | 7.2 | 7.4 |
| Freeze-thaw stability | Good | Good | Good |
| Stain removal | 1 | 2+ | |

Thus, finger scrub tests indicated the scrub resistance was equal to or slightly better than the control (vinyl acetate-dioctyl maleate interpolymer); improved Gardener scrub results were obtained; and stain removal characteristics were improved. The test results also established that enamel holdout properties and freeze-thaw stability characteristics were as good as the control sample. The improved Gardener scrub characteristics means that cheaper paints can be made with the interpolymers of this invention and still have the same hiding characteristics.

From the foregoing, it will be seen that this invention is well adapted to obtain all of the ends and objects hereinabove set forth together with other advantages which are obvious and which are inherent to the system. The claimed interpolymers provide substantially improved characteristics including improved scrub resistance when employed in paint formulations. A lower cost is possible due to lower levels of emulsifier and protective colloid necessary to produce stable interpolymers. Moreover, interpolymers in accordance with the present invention permit water based paint formulations to be made which can be used for both interior and exterior applications.

Obviously, many other modifications and variations of the invention as hereinbefore set forth can be made without departing from the spirit and scope thereof.

What is claimed is:

1. An interpolymer composition for use as a pigment binder in water based paints, said interpolymer comprising from about 90 to about 35% by weight of vinyl chloride, about 5 to about 30% by weight of ethylene and 0 to about 40% by weight of vinyl acetate which interpolymer has a glass transition temperature ($T_g$) of between about 20 and about −10 degrees C., said interpolymer containing a protective colloid selected from the group consisting of hydroxyethyl cellulose, polyvinyl alcohol, partially acetylated polyvinyl alcohol (up to 50% acetylated), casein, hydroxyethyl starch, carboxymethyl cellulose, and gum arabic in an amount from about 0.05 to about 2% by weight based on the total interpolymer.

2. The interpolymer composition of claim 1 wherein the protective colloid is hydroxyethyl cellulose present in an amount from about 0.15 to about 0.9% by weight, based on the total interpolymer.

3. A vinyl chloride-ethylene-vinyl acetate interpolymer composition having a glass transition temperature ($T_g$) of between about 20 and about −10 degrees C. and containing about 0.15 to about 0.9% by weight of hydroxyethyl cellulose based on the total interpolymer, which interpolymer comprises from about 90 to about 35% by weight of vinyl chloride, about 5 to about 30% by weight of ethylene, and 0 to about 40% by weight of vinyl acetate.

4. An aqueous paint composition comprising a synthetic polymer latex and a pigment, said synthetic polymer latex comprising an interpolymer of from about 90 to about 35% by weight of vinyl chloride, about 5 to about 30% by weight of ethylene and 0 to about 40% by weight of vinyl acetate which interpolymer has a glass transition temperature ($T_g$) of between about 20 and about −10 degrees C., and wherein the interpolymer contains a protective colloid selected from the group consisting of hydroxyethyl cellulose, polyvinyl alcohol, partially acetylated polyvinyl alcohol (up to 50% acetylated), casein, hydroxyethyl starch carboxymethyl cellulose, and gum arabic in an amount from about 0.5 to about 2% by weight based on the total interpolymer.

5. The aqueous paint composition of claim 4 wherein the protective colloid is hydroxyethyl cellulose present in an amount from about 0.15 to about 0.9% by weight, based on the total interpolymer.

6. The aqueous paint composition of claim 4 in which said pigment is present in an amount between 10 and 1000 parts by weight per 100 parts of the synthetic polymer latex, based on a latex solids basis.

7. An aqueous paint composition comprising a synthetic polymer latex and a pigment, said synthetic polymer latex comprising an interpolymer of vinyl chloride, ethylene and vinyl acetate having a glass transition temperature ($T_g$) of between about 20 and about −10 degrees C. and containing about 0.15 to about 0.9% by weight of hydroxyethyl cellulose based on the total interpolymer, which interpolymer comprises from about 90 to about 35% by weight of vinyl chloride, about 5 to about 30% by weight of ethylene, and 0 to about 40% by weight of vinyl acetate, and wherein said pigment is present in an amount between 10 and 1000 parts by weight per 100 parts of the interpolymer, based on a latex solids basis.

8. A paint composition comprising a synthetic polymer latex, a pigment, a dispersing agent, a coalescing solvent and water, wherein said synthetic polymer latex comprises an interpolymer of from about 90 to about 35% by weight of vinyl chloride, about 5 to about 30% by weight of ethylene and 0 to about 40% by weight of vinyl acetate which interpolymer has a glass transition temperature ($T_g$) of between about 20 and about −10 degrees C., wherein said pigment is present in an amount between 10 and 1000 parts by weight per 100 parts of the synthetic polymer latex, based on a latex solids basis wherein said dispersing agent is present in an amount between 0.5 and 10 parts by weight per 100 parts of interpolymer, wherein the coalescing solvent is present in an amount between 0 and 10 parts by weight per 100 parts of interpolymer and wherein sufficient water is present to provide a solids content of 40 to 60%.

9. A surface coated with the paint composition of claim 4.

10. A surface coated with the paint composition of claim 8.

References Cited

UNITED STATES PATENTS

| 2,703,794 | 3/1955 | Roedel | 260—29.6 T |
| 3,632,542 | 1/1972 | Fox et al. | 260—29.6 T |
| 3,639,326 | 2/1972 | Kray et al. | 260—29.6 T |

FOREIGN PATENTS

| 2,001,104 | 3/1971 | Germany | 260—29.6 T |

LUCILLE M. PHYNES, Primary Examiner

U.S. Cl. X.R.

260—17 A & R, 17.4 R & ST, 29.6 RW, 29.6 WA, 29.6 T & TA, 80.6